(12) United States Patent
Holsnijders et al.

(10) Patent No.: US 9,835,201 B2
(45) Date of Patent: Dec. 5, 2017

(54) BEARING ASSEMBLY WITH LUBRICATION CARTRIDGE

(71) Applicant: AKTIEBOLAGET SKF, Göteborg (SE)

(72) Inventors: Jos Holsnijders, Leerdam (NL); Bob Klijnveld, Bruchem (NL); Gert-Jan Scheers, Huissen (NL)

(73) Assignee: AKTIEBOLAGET SKF, Gothenburg (SE)

( * ) Notice: Subject to any disclaimer, the term of this patent is extended or adjusted under 35 U.S.C. 154(b) by 14 days.

(21) Appl. No.: 14/901,725

(22) PCT Filed: Jul. 3, 2013

(86) PCT No.: PCT/EP2013/063985
§ 371 (c)(1),
(2) Date: Dec. 29, 2015

(87) PCT Pub. No.: WO2015/000510
PCT Pub. Date: Jan. 8, 2015

(65) Prior Publication Data
US 2016/0123398 A1    May 5, 2016

(51) Int. Cl.
*F16C 19/00* (2006.01)
*F16C 33/66* (2006.01)
*F16C 19/38* (2006.01)

(52) U.S. Cl.
CPC ...... *F16C 33/6611* (2013.01); *F16C 33/6625* (2013.01); *F16C 33/6633* (2013.01); *F16C 19/386* (2013.01); *F16C 2326/43* (2013.01)

(58) Field of Classification Search
CPC .............. F16C 33/6611; F16C 33/6625; F16C 33/6633; F16C 2326/43
See application file for complete search history.

(56) References Cited

U.S. PATENT DOCUMENTS

| | | |
|---|---|---|
| 503,143 A | 8/1893 | Jones |
| 3,424,273 A | 1/1969 | Carlson et al. |
| 3,493,279 A * | 2/1970 | Warren ............... F16C 33/6618 384/469 |

(Continued)

FOREIGN PATENT DOCUMENTS

| | | | |
|---|---|---|---|
| DE | 102006057775 A1 | | 6/2008 |
| EP | 0654613 | * | 5/1995 |

(Continued)

*Primary Examiner* — James Pilkington
(74) *Attorney, Agent, or Firm* — Bryan Peckjian; SKF USA Inc. Patent Dept.

(57) ABSTRACT

A bearing assembly comprises a rolling element bearing having an inner ring, an outer ring and a set of rolling elements arranged in a bearing cavity between the inner and outer rings. A first grease is provided in the bearing cavity, which has a first thermal bleed rate at a specific reference temperature. The bearing assembly further comprises a grease cartridge, arranged at an axial side of the bearing cavity, whereby the cartridge has axially extending passageways that open into the bearing cavity, and whereby at least some of the passageways are filled with a second grease. The second grease has a second thermal bleed rate at the specific reference temperature which is lower than that of the first grease.

14 Claims, 3 Drawing Sheets

(56) References Cited

U.S. PATENT DOCUMENTS

| | | | |
|---|---|---|---|
| 4,472,004 A | 9/1984 | Fingerle et al. | |
| 4,609,293 A | 9/1986 | Bayer et al. | |
| 5,803,616 A | 9/1998 | Spersson et al. | |
| 6,854,892 B2 | 2/2005 | Lauck | |
| 2012/0301065 A1* | 11/2012 | Mori | F16C 33/6607 384/469 |
| 2013/0012416 A1* | 1/2013 | Fujinami | C10M 169/02 508/154 |

FOREIGN PATENT DOCUMENTS

| | | |
|---|---|---|
| EP | 0807763 A1 | 11/1997 |
| EP | 2447348 A1 | 5/2012 |
| WO | 2005/071051 A1 | 8/2005 |

* cited by examiner

BEARING ASSEMBLY WITH LUBRICATION CARTRIDGE

CROSS REFERENCE TO RELATED APPLICATION

This is a United States National Stage Application claiming the benefit of International Application Number PCT/EP2013/063985 filed on 3 Jul. 2013, which is incorporated herein by reference in its entirety.

FIELD OF THE INVENTION

The present invention relates to a bearing assembly comprising a cartridge at least partly filled with a grease lubricant.

BACKGROUND TO THE INVENTION

A bearing assembly of this kind is known from U.S. Pat. No. 5,803,616, which discloses a double-row taper roller bearing suitable for railway applications in which a grease retainer is mounted to an outer ring of the bearing between the two rows of tapered rollers, at a small-diameter end of the rollers. In a tapered roller bearing, grease lubricant is urged from the small diameter end of the bearing to a large-diameter end under the action of centrifugal force. Therefore, grease that is initially provided between the two roller sets migrates relatively quickly to an axially outer side of the bearing, where the grease contributes little to the lubrication of the bearing. As a result, relubrication is required on a regular basis. Furthermore, the migration of the grease from the small diameter end to the large diameter end creates churning losses and friction.

The retainer disclosed in U.S. Pat. No. 5,803,616 has a ring-shaped channel which is axially delimited by two side walls of the retainer. The side walls have apertures for communicating the inner space of the channel with the bearing space. The grease retainer therefore allows some migration of grease to the bearing space but prevents the grease from migrating too quickly, even under the influence of centrifugal forces and shock loads experienced during operation. Retaining the grease therefore helps to increase relubrication intervals.

Grease retention is also a problem in bearing applications where the bearing has a vertical axis of rotation, such as, for example, the tail rotor bearing of a helicopter. A solution to this problem in a bearing of this kind is disclosed in U.S. Pat. No. 6,854,892. A swashplate assembly is described in which a rotating swashplate is supported relative to a stationary swashplate by means of a duplex bearing arrangement having a spacer arrangement between the two bearings. The spacer arrangement has a lubricant chamber, a first spacer element comprising a centrifugal ramp and a second spacer element comprising a baffle. The baffle divides the lubricant chamber into first and second chambers, with each chamber communicating with one of the bearings in the duplex arrangement. The centrifugal ramp counteracts the effects of gravity and uses centrifugal forces to ensure a supply of lubricant to the upper bearing of the arrangement.

There is still room for improvement.

SUMMARY OF THE INVENTION

Grease is a semi-solid substance comprising a base oil held in a thickener matrix, and grease lubrication depends on oil being released from the thickener matrix. Within a bearing, oil is released from grease due to mechanical stresses on the grease, such as sheering and centrifugal forces. Thermal oil bleeding also occurs, particularly at elevated temperatures. A test for determining the tendency of base oil to separate from grease at elevated temperature is defined in ASTM D6184.

A grease with a suitable oil bleed rate for a particular application is therefore selected based on the expected operating loads, speeds and temperature range. The oil bleed rate of the grease may be adjusted by optimising the composition, e.g. the thickener, base oil type, and by adding polymers or other components. The manufacturing process also plays a key role in determining the distribution of the thickener matrix within the base oil and consequently the bleed characteristics of the finished grease.

Grease life within a bearing ends when grease reservoirs are no longer able to supply base oil for forming an oil film that separates rolling contact surfaces of the bearing. A grease reservoir is defined as a quantity of grease that is actually able to contribute to the lubrication. For example, a relatively large quantity of grease may be present on the axially inner side of a bearing seal, but at this location, the grease contributes practically nothing to the lubrication of the bearing. By contrast, grease which adheres to a bearing cage forms an important grease reservoir.

As mentioned, operating temperature plays a key role in determining the oil bleed rate of grease and is therefore also a factor which influences when the grease reservoirs become exhausted. When the bearing application has a wide operating temperature range, the selected grease may need to provide an adequate bleed rate at e.g. a relatively low temperature of 60 degrees. At a relatively high operating temperature of, say, 120 degrees the bleed rate will be significantly higher, leading to faster depletion of the grease reservoirs within the bearing.

Consequently, it is an aim of the present invention to define a grease-lubricated bearing assembly having grease reservoirs that provide adequate lubrication over a wide temperature range for an extended period of time. This aim is achieved by means of a bearing assembly having:
- a rolling element bearing having an inner ring, an outer ring and a set of rolling elements arranged in a bearing cavity between the inner ring and the outer ring;
- a first grease is provided in the bearing cavity, the first grease having a first thermal bleed rate at a specific reference temperature;
- a grease cartridge, arranged at an axial side of the bearing cavity, the grease cartridge comprising axially extending passageways which open into the bearing cavity, wherein at least some of the passageways are filled with a second grease, wherein the second grease has a second thermal bleed rate at the specific reference temperature that is lower than the first thermal bleed rate of the first grease.

The bearing assembly of the invention comprises a rolling element bearing having an inner ring, an outer ring and a set of rolling elements arranged in a bearing cavity between the inner and outer rings. A first grease is provided in the bearing cavity, which has a first thermal bleed rate at a specific reference temperature. The bearing assembly further comprises a grease cartridge, arranged at an axial side of the bearing cavity, whereby the cartridge has axially extending passageways that open into the bearing cavity, and whereby at least some of the passageways are filled with a second grease. The second grease has a second thermal bleed rate at the specific reference temperature which is lower than that of the first grease.

The thermal bleed rate is a static oil bleed rate that may be determined according to ASTM D6184, ASTM D1742, IP 121 or other standard test. Typically, a sample of grease is supported on a mesh screen in a controlled temperature environment and oil which bleeds from the grease is collected. After a predetermined number of hours, the amount of collected oil is measured to determine the percentage of oil which has separated from the grease. Oil bleed rate is thus defined in terms of percentage oil loss. The reference temperature at which the test is conducted is suitably a temperature that would be experienced in the bearing during normal operation.

The second grease in a bearing assembly according to the invention is thus adapted to retain a greater percentage of its base oil than the first grease during normal bearing operation. When the first grease is no longer able to supply base oil, and an oil film that separates rolling contacts of the bearing breaks down, bearing temperature will rise sharply. This will stimulate thermal bleeding from the second grease, to provide adequate lubrication for a further period of time.

Advantageously, the grease cartridge is at least partly made from a honeycomb structure having axially extending passageways with a geometric cross-section. The cross-section of the passageways may be hexagonal, triangular, square, circular, or may have another suitable geometry. One advantage of retaining grease within a honeycomb structure is that the grease is in contact with a relatively large surface area. The grease therefore has a large surface area to stick to and will not be quickly released through the passageway openings. The large surface area also facilitates heat conduction. Suitably, the honeycomb structure is made of a metallic material such as aluminium, to ensure that the lubricating behaviour of the second grease in the cartridge is thermally responsive.

In some embodiments, the grease cartridge contains only the second grease and is adapted to function as an emergency grease reservoir for providing lubrication at excessively high temperatures. The second grease is then selected to have a very low bleed rate at normal operating temperatures. Depending on the temperature rise within the bearing, the second grease itself may be released from the cartridge. Advantageously, the second grease can be provided with a colorant or an odour for indicating during an inspection of the bearing cavity that the second grease has been released.

In other embodiments, the grease cartridge contains at least one further grease. The further grease may be the same grease as the first grease. The grease cartridge then contributes to the normal lubrication of the bearing assembly by retaining the first grease in a reservoir near to the bearing cavity.

The further grease can also be a third grease, which has a third thermal bleed rate, different from the first and second bleed rates. For example, the third thermal bleed rate may lie between the first and second bleed rates, such that the third grease continues to provide lubrication after the first grease is depleted and the second grease then provides emergency lubrication if the third grease ceases to provide lubrication.

Preferably, to ensure compatibility with the first grease, the second grease and the third grease (if present) comprise the same base oil as the first grease.

The bearing assembly according to the invention may comprise a single-row rolling element bearing. In other examples, the bearing comprises a first set and a second set of rolling element respectively provided within a first and a second cavity of the bearing. The grease cartridge is advantageously arranged between the two bearing cavities and comprises axially extending passageways that open into the first cavity and the second cavity.

In some examples of a bearing assembly according to the invention, the grease cartridge is mounted to a part of the assembly which is non-rotational during operation. To facilitate the release of lubricant from the cartridge, the axially extending passageways may slope downwards, such that gravity acts on the grease.

In other examples of a bearing assembly according to the invention, the grease cartridge is mounted to a part of the assembly which is rotational during operation. The grease cartridge may comprise axial passageways which are parallel to a rotation axis of the bearing and/or may comprise passageways that slope away from the bearing axis of rotation such that centrifugal forces on the grease in the cartridge cause an axial movement of base oil in the grease and possibly also a axial movement of the grease itself. Sloping passageways are advantageous when the cartridge is arranged between an upper and a lower bearing cavity and the bearing has a vertical axis of rotation. The centrifugal force will counteract gravity to provide lubrication to the upper bearing.

When the cartridge is rotational in use, the second grease (and any other greases) in the grease cartridge will experience centrifugal bleeding. Suitably, the second grease has a centrifugal bleed rate according to ASTM D4425 which is no higher than that of the first grease, to ensure that when the first grease is depleted, the second grease still comprises a greater percentage of base oil for providing lubrication.

Thus, a bearing assembly according to the invention can prevent catastrophic bearing failure, as well as lengthening normal relubrication intervals. Other benefits will become apparent from the following detailed description and accompanying drawings.

DETAILED DESCRIPTION OF THE PRESENT INVENTION

Figure 1A:
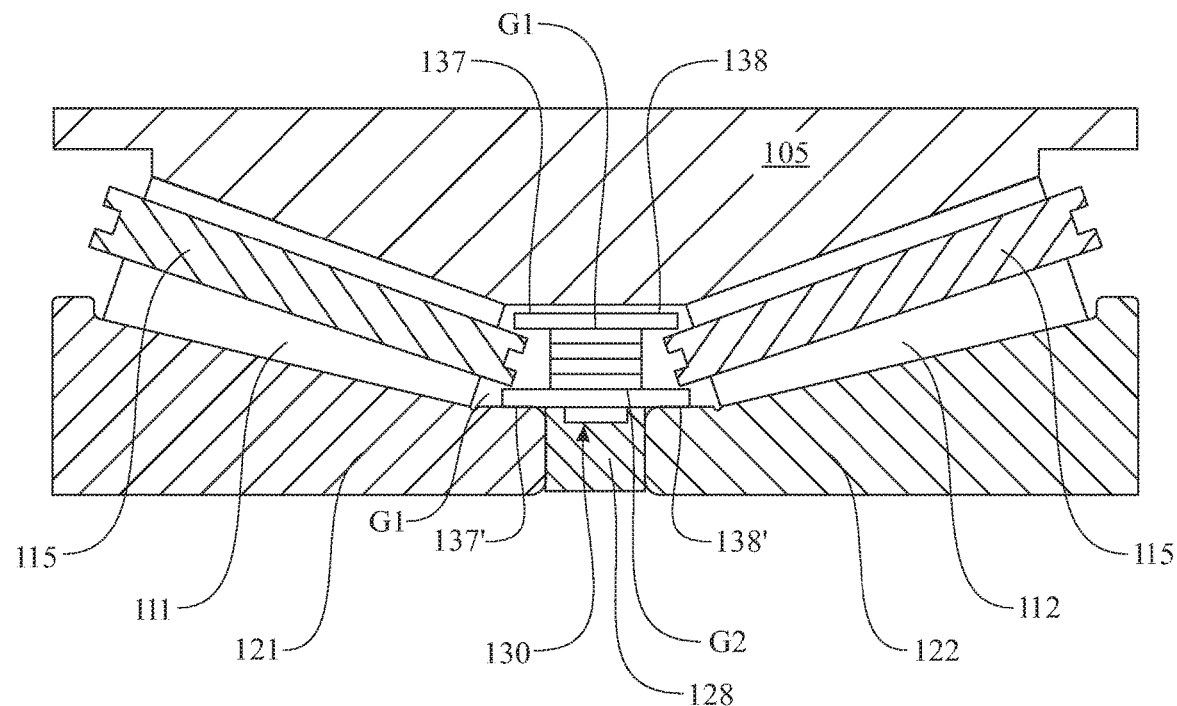
FIG. 1A shows a part cross-sectional view of an example of a first embodiment of a bearing assembly according to the invention comprising a grease cartridge formed from a honeycomb structure.

An example of a first embodiment of a bearing assembly according to the invention is shown in FIG. 1A. The bearing assembly 100 comprises a double-row taper roller bearing having an outer ring 105 with a first outer raceway for a first set of tapered rollers 111 and a second outer raceway for a second set of tapered rollers 112. Each of the first and second sets of rollers 111, 112 is retained by a cage 115, and the bearing further comprises a first inner ring 121 and a second inner ring 122, respectively having first and second inner raceways. A first bearing cavity is defined between the first inner ring 121 and the outer ring 105 and a second bearing cavity is defined between the second inner ring 122 and the outer ring 105. The bearing is adapted for inner ring rotation in this example.

The bearing is grease lubricated, whereby a first grease G1 is provided between the outer ring 105 and the inner rings 121, 122 in a conventional manner. The first grease is, for example, a lithium grease with a synthetic mineral base oil, which is suitable for an operating temperature range of −50-130° C. The first grease has a first bleed rate according to ASTM D6184 of 1.2% at a reference temperature of 100 degrees, after 30 hours. To ensure proper lubrication at excessively high operating temperatures, the bearing assembly 100 additionally comprises a grease cartridge 130 arranged between the first and second sets of tapered rollers 111, 112, which cartridge 130 is partly filled with a second grease G2. The second grease G2 comprises the same base oil as the first grease, but the base oil is held in a complex lithium thickener matrix. The second grease has a bleed rate according to ASTM D6184 of 0.6% and is suitable for operating temperatures of up to 250° C.

Consequently, the second grease G2 experiences relatively little thermal bleeding during bearing operation in a normal operating temperature range of 70-100° C., and will retain its base oil for a longer period than the first grease. When available reservoirs of the first grease G1 are no longer able to release oil, the lubricating film which separates the bearing rolling contacts will break down, generating friction and heat. At a temperature of e.g. 130° C., the second grease G2, which still has reserves of base oil, will experience increased thermal bleeding and is able to release oil. The bearing will therefore be able to operate for a certain period of time under "emergency" conditions without bearing failure.

In a further development, the grease cartridge not only comprises a reservoir of emergency lubricant, i.e. the second grease G2, but also comprises a further grease that contributes to the lubrication of the bearing under normal operating conditions. To ensure compatibility, the further grease is preferably the first grease G1.

Figure 1B:
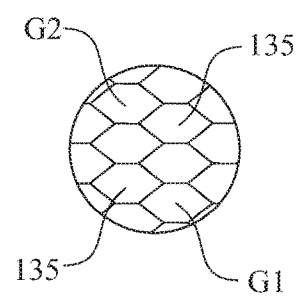
FIG. 1B shows a detail through a cross-section of the honeycomb structure.

In the depicted embodiment, the grease cartridge 130 is mounted to a spacer ring 128 that separates the first and second inner rings 121, 122. Advantageously, the spacer ring has a shaped recess and the grease cartridge 130 has a correspondingly shaped portion that fits into the recess. Preferably, the grease cartridge 130 has a honeycomb structure comprising axially extending passageways 135 with a geometric cross-section (see FIG. 1B). The honeycomb structure comprises passageways with a hexagonal cross-section in this example, but other geometries are possible; e.g. triangular, diamond shaped, circular. The axial passageways 135 in a radially inner portion of the cartridge 130 are filled with the first grease G1 and the passageways 135 in a radially outer portion are filled with the second grease G2. The passageways 135 are open at first and second axial sides, for allowing the release of grease or the release of base oil from the grease into the first and second bearing cavities.

One advantage of retaining grease within a honeycomb structure is that the grease is in contact with a relatively large surface area. The grease therefore has a large surface area to stick to and will not be quickly released through the passageway openings, which is particularly important when the grease cartridge 130 is mounted to the rotating bearing ring. The large surface area also facilitates heat conduction. Suitably, the honeycomb structure is made of a metallic material such as aluminium. Thus, increases in heat (due to insufficient lubrication of rolling contacts) are readily transferred to the greases in the honeycomb structure. At temperatures which the first grease G1 in the cartridge "sees" as high, e.g. 130° C., thermal bleeding will increase significantly, facilitating the delivery of lubricant. The second grease G2 will also experience some more thermal bleeding, but relatively less than the first grease, meaning that base oil remains available under emergency conditions. In effect, the lubricating behaviour of the cartridge 130 is thermally responsive, so that greases in the cartridge 130 deliver lubricant when it is needed most.

In the depicted example, the cartridge 130 is mounted to a rotating part. The first and second greases in the passageways 135 therefore experience centrifugal force and are pressed against a radially outer side of the passageways. This causes some oil to separate from the thickener matrix. In high speed applications, both the first and second greases preferably have a relatively high resistance to centrifugal bleeding. In any case, the second grease G2 suitably has a centrifugal bleed rate that is no higher than that of the first grease G1.

The passageway openings in this example are parallel to the bearing axis of rotation, meaning that there will be no movement of lubricant through the passageways in an axial direction due to the centrifugal force. At the passageway openings, however, oil and/or grease will inevitably escape due to vibration, shocks and, possibly, a pressure differential across the bearing. The stiffness of the grease and the size of the axial passageways 135 may be tuned such that the movement of grease is permitted or may be tuned such that only base oil is released from the thickener matrix.

In the depicted example, the first grease G1 has a lower stiffness than the second grease G2 and the cartridge 130 is adapted to release the first grease G1. The first grease escapes at openings of the axial passageways and vibration will cause grease at the centre of the axial passageways 135 to migrate towards the openings.

The stiffer second grease G2 is adapted to remain within the cartridge and to release base oil only. A grease portion at the openings therefore becomes depleted in oil, i.e. drier. Without being bound by the theory, this drier portion is thought to take up oil from a neighbouring grease portion that has not been depleted, in the manner of a sponge soaking up liquid. The depleted neighbouring portion then soaks up oil from an axially inner neighbouring portion and so on.

As mentioned, the amount of oil release will increase due to thermal bleeding when bearing temperature increases, which is precisely when more lubrication is needed.

For proper bearing lubrication, it is not only important that lubricant is present, but also that lubricant is present at a location where it can readily contribute to the formation of an oil film that separates the contacting surfaces within the bearing. In an advantageous development, the grease cartridge 130 comprises axial extensions which act as a conduit for delivering lubricant to a desired location within the bearing. In the example of FIG. 1A, the grease cartridge 130 has first and second side walls that respectively face the first and second bearing cavities. The grease cartridge 130 further comprises first axial extensions 137, 137' that extend from the first side wall towards the first bearing cavity and comprises second axial extensions 138, 138' that extend from the second side wall towards the second bearing cavity. The axial extensions are formed from the passageways 135 of the honeycomb structure, whereby the passageway openings of the axial extensions are arranged just above and just below an axially inner portion of each cage 115. Thus, the cartridge 130 in this example is adapted to supply grease (the first grease G1) via the radially inner axial extensions 137', 138' to an underside of the bearing cage 115. As mentioned earlier, this is a particularly important grease reservoir within a bearing. Furthermore, base oil that bleeds from the second grease G2 is supplied via the radially outer extensions 137, 138 to a location close to the bearing outer raceways. An underside of the radially outer extensions 137, 138 will also serve as a retention surface for grease (G1) that is released from the rotating cartridge and then flung outwards. Thus, lubrication is ensured for a prolonged period at a large range of operating temperatures.

Figure 2A:
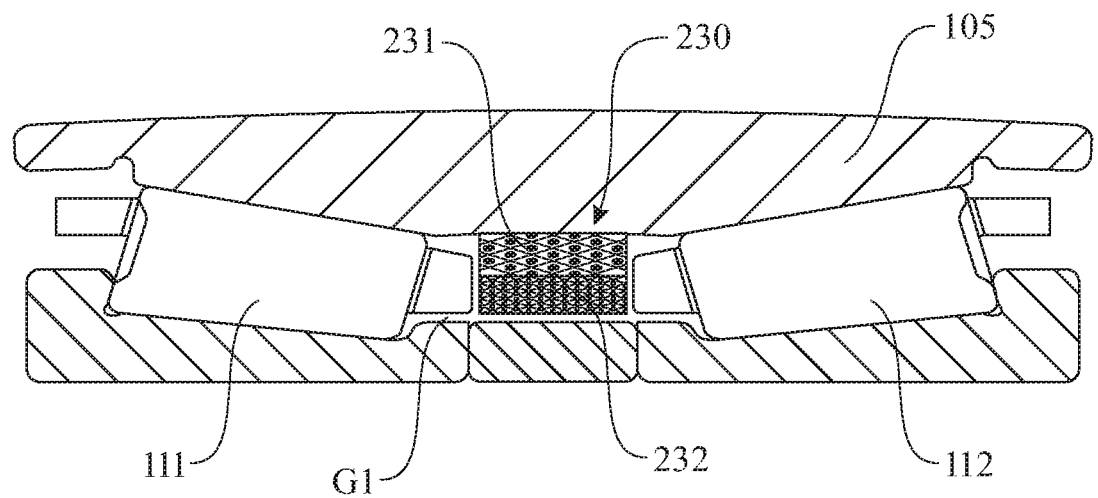
FIG. 2A shows a part cross-sectional view of an example of a further embodiment of a bearing assembly according to the invention comprising a grease cartridge having a honeycomb structure provided in a cavity of the cartridge.

A second example of a bearing assembly according to the invention is depicted in FIG. 2A. Again the bearing is a double row taper roller bearing, which is grease lubricated with a first grease G1 and is provided with a grease cartridge 230 comprising a second grease G2 which has lower thermal bleed rate than the first grease. In this example, the grease cartridge 230 is mounted to the bearing outer ring 105, between the first set 111 and the second set 112 of tapered rollers. The outer ring is non-rotational during use.

Figure 2B:
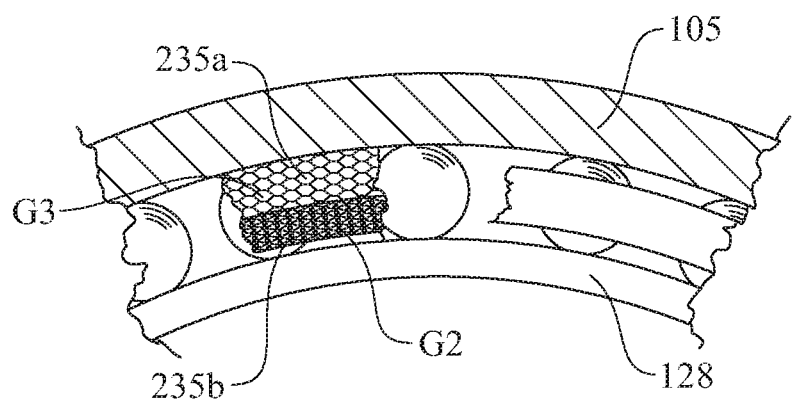
FIG. 2B shows a cut-away partial cross-section of the honeycomb structure from FIG. 2A.

The grease cartridge 230 is again formed from a honeycomb structure of e.g. aluminium. In this example, the grease cartridge has a radially outer portion 231 and a radially inner portion 232, whereby axially extending passageways 235a (refer FIG. 2B) of the outer portion 231 have a larger cross-sectional area that the passageways 235b of the inner portion 232. The second grease G2 is provided in the inner portion 232 of the cartridge and a third grease G3 is provided in the outer portion. The second grease is less stiff than the third grease, and the relatively smaller axial passageways 235b will prevent migration of the second grease, until it is desired. In this example, the second grease G2 has a very low thermal bleed rate and is adapted to be released from the cartridge 230 at extremely high (emergency) temperatures of above e.g. 150 degrees.

The third grease G3 comprises the same base oil as first grease G1, but has a slightly lower thermal bleed rate. Further, the stiffness of the third grease G3 and the size of the first axial passageways 235a are tuned such that vibrations during normal bearing operation enable a small amount of the third grease to be released from the cartridge 230. Consequently, the third grease can prolong normal lubrication, while the second grease functions as an emergency lubricant.

Figure 3:
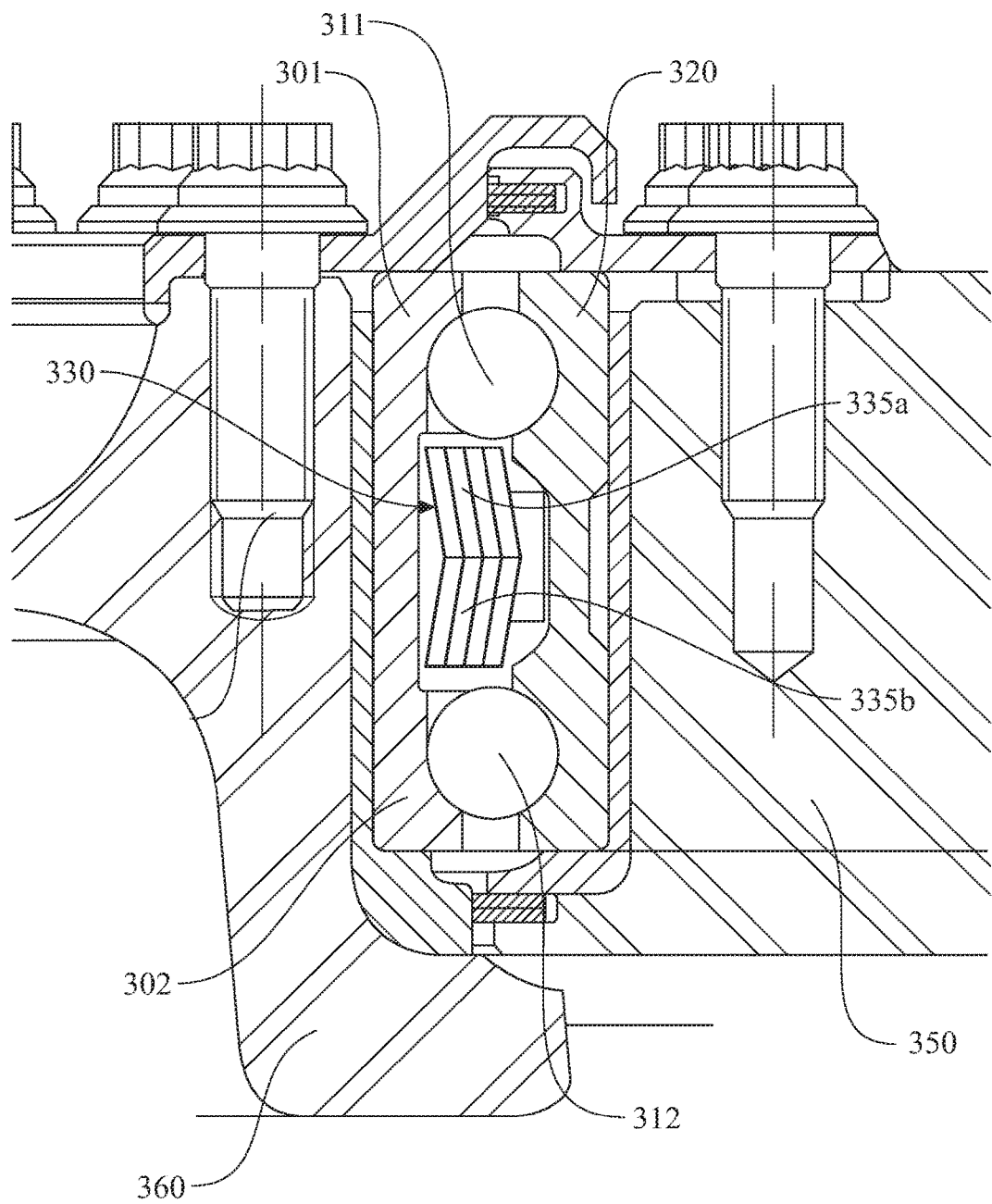
FIG. 3 shows a part cross-sectional view of an example of a bearing assembly according to the invention for use in a helicopter tail rotor bearing.

The function of emergency lubrication, to prevent catastrophic bearing failure, is particularly important in aviation applications. The tail rotor bearing in a helicopter is one such application and an example of a bearing assembly of this kind according to the invention is shown in FIG. 3.

A rotational swashplate 350 is supported relative to a stationary swashplate 360 by means of a double-row angular contact bearing. The bearing comprises a one-piece inner ring 320 mounted to the rotational swashplate, the inner ring respectively having first and second inner raceways for a first row 311 and a second row 312 of balls. The bearing further comprises a first outer ring 301 and a second outer ring 302 mounted to the stationary swashplate 360. The bearing has a vertical axis of rotation (not shown), whereby the first row of balls 311 is provided in an upper bearing cavity and the second row of balls if provided in a lower bearing cavity. A first grease is provided in the upper and lower bearing cavities. In accordance with the invention, the bearing is further provided with a grease cartridge 330 comprising axially extending passageways 335a. 335b at least some of which are filled with a second grease that has a lower thermal bleed rate than the first grease.

The first grease has a mineral base oil and complex lithium thickener and has a thermal bleed rate of 7 wt. %, determined according to ASTM D6184 after 30 hours at 177° C. The second grease has a thermal bleed rate of 3.5 wt. % under the same conditions, and is able to provide lubrication at temperatures of up to 230° C. The second grease therefore provides a long-lasting reservoir of grease and serves as an emergency lubricant if the first grease fails and a sharp temperature rise occurs.

The second grease is provided in the axially extending passageways of the grease cartridge 330. In this example, the grease cartridge is mounted to a rotating part and has first passageways 335a that slope away from the bearing axis of rotation towards the upper bearing cavity. The cartridge 330 further has second passageways 335b that slope away from the bearing axis of rotation towards the lower bearing cavity. As a result an axial component of force will act on the second grease, to facilitate the release lubricant from the cartridge. This is especially important for the upper bearing cavity in order to counteract gravity.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. A bearing assembly comprising
   a rolling element bearing having an inner ring, an outer ring and a set of rolling elements arranged in a bearing cavity between the inner ring and the outer ring;
   a first grease is provided in the bearing cavity, the first grease having a first thermal bleed rate at a specific reference temperature;
   a grease cartridge, arranged at an axial side of the bearing cavity, the grease cartridge comprising axially extending passageways which open into the bearing cavity;
   a second grease; and
   a further grease,
   wherein the second grease has a second thermal bleed rate at the specific reference temperature that is lower than the first thermal bleed rate of the first grease,
   wherein some of the passageways include the second grease and others passageways comprise the further grease,
   wherein the further grease is different from the second grease.

2. The bearing assembly according to claim 1, wherein the grease cartridge is at least partly made from a honeycomb structure, the honeycomb structure comprises the axially extending passageways.

3. The bearing assembly according to claim 2, wherein the honeycomb structure is made of a metallic material.

4. The bearing assembly according to claim 1, wherein the further grease is the same grease as the first grease.

5. The bearing assembly according to claim 1, wherein the further grease is a third grease,
   wherein the third grease has a third oil bleed rate at the specific reference temperature that is different from the first thermal bleed rate and second thermal bleed rate.

6. The bearing assembly according to claim 1, wherein the second grease comprises the same base oil as the first grease.

7. The bearing assembly according to claim 1, wherein the second grease is provided with one of a colorant or an odour for indicating during an inspection of the bearing cavity that lubricant has been released from the second grease.

8. The bearing assembly according to claim 1, the bearing further comprising a first set of rolling elements and a second set of rolling elements respectively provided within a first cavity of the bearing and a second cavity of the bearing, wherein the grease cartridge is arranged between the two bearing cavities and comprises axially extending passageways that open into the first cavity and the second cavity.

9. The bearing assembly according to claim 1, wherein the grease cartridge is mounted to a part of the assembly which, during operation, is a non-rotational part of the assembly.

10. The bearing assembly according to claim 1, wherein the grease cartridge is mounted to a part of the assembly that is rotational during operation.

11. The bearing assembly according to claim 10, wherein at least some of the axially extending passageways of the grease cartridge are angled away from the bearing rotation axis.

12. The bearing assembly according to claim 1, wherein the grease cartridge comprises axially extending passageways that have a smaller cross-sectional area than other axially extending passageways of the cartridge.

13. The bearing assembly according to claim 1, wherein the second grease has a higher stiffness than the first grease.

14. A bearing assembly comprising
    a rolling element bearing having an inner ring, an outer ring and a set of rolling elements arranged in a bearing cavity between the inner ring and the outer ring;
    a first grease is provided in the bearing cavity, the first grease having a first thermal bleed rate at a specific reference temperature; and
    a grease cartridge, arranged at an axial side of the bearing cavity, the grease cartridge comprising axially extending passageways which open into the bearing cavity,
    wherein at least some of the passageways are filled with a second grease,
    wherein the second grease has a second thermal bleed rate at the specific reference temperature that is lower than the first thermal bleed rate of the first grease,
    wherein some of the axially extending passageways of the grease cartridge have a smaller cross-sectional area than other axially extending passageways of the cartridge.

\* \* \* \* \*